United States Patent [19]

Grubka

[11] 4,272,272

[45] Jun. 9, 1981

[54] METHOD AND APPARATUS FOR PRODUCTION OF MINERAL FIBERS

[75] Inventor: Lawrence J. Grubka, Heath, Ohio

[73] Assignee: Owens-Corning Fiberglas Corporation, Toledo, Ohio

[21] Appl. No.: 74,357

[22] Filed: Sep. 10, 1979

[51] Int. Cl.³ .............................................. C03B 17/02
[52] U.S. Cl. .............................................. 65/1; 65/2; 65/12
[58] Field of Search ................................... 65/1, 2, 12

[56] References Cited

U.S. PATENT DOCUMENTS

| 3,672,857 | 6/1972 | Stalego ..................................... 65/12 |
| 3,867,119 | 2/1975 | Kasuga ..................................... 65/1 X |

*Primary Examiner*—Robert L. Lindsay, Jr.
*Attorney, Agent, or Firm*—Ronald C. Hudgens; Philip R. Cloutier; Kenneth H. Wetmore

[57] ABSTRACT

The present invention embraces a method of, and apparatus for, forming mineral fibers, such as glass, comprising flowing stream of molten mineral material from a stream feeder through a plurality of orificed projections depending from the feeder floor, attenuating fibers from the streams of molten mineral material, and directing gas upwardly into contact with the streams of molten mineral material at a velocity and in an amount effective to convey away from the streams sufficient heat to render the material of the streams attenuable to fibers without appreciably disturbing the ambient gas above the streams in the region of the orificed projections, the improvement comprising restricting the flow of gas adjacent the plate in the region of the perimeter of the plurality of orificed projections while leaving the directed gas free to flow in the region of the perimeter of the streams of material.

7 Claims, 5 Drawing Figures

METHOD AND APPARATUS FOR PRODUCTION OF MINERAL FIBERS

TECHNICAL FIELD

The invention relates to a method of, and apparatus for, forming glass fibers from heat softened mineral material, such as glass. More specifically, this invention relates to a method of, and apparatus for, controlling gas movement adjacent the bottom of a glass fiber-forming feed in the region of the orificed projections of the feeder.

BACKGROUND ART

In recent years, there has been considerable interest in the production of glass fibers. Due to the increased usage of glass fibers, this interest has been particularly focused on increasing the production of individual fiber forming stations.

In the production of fibers, molten glass is typically passed through orificed tips or projections in a bushing or a stream feeder to create individual fibers. As the molten streams of glass flow through the orificed projections for attenuation into fibers, the fiber-forming environment below the bushing must be carefully controlled for a stable fiber-forming operation.

Conventionally, the environment adjacent the streams of molten glass is controlled by placing metallic heat exchanging units or fin shields beneath the bushing and between rows of tips. Such fin shield units have been used for many years to control the fiber forming region beneath the bushing. Such a heat exchanging device is described in U.S. Pat. No. 2,908,036.

Over the years, the number of fibers capable of being produced by a single bushing has increased greatly. In the past it was common for a bushing to produce about 200 fibers. Today, bushings can produce 2,000, or more, fibers. As the number of fibers per bushing continues to increase, problems with conventional fiber forming processes and apparatus have arisen.

As bushings are produced to manufacture even larger numbers of fibers per bushing and as the throughput per bushing tip is increased, environmental control by conventional fin shield units can become inadequate. There has been considerable activity in the glass fiber forming field to develop a process and apparatus for controlling the fiber forming environment in such bushings.

SUMMARY OF THE INVENTION

The present invention comprises a method of forming mineral fibers, such as glass fibers, comprising flowing streams of molten mineral material from a stream feeder through a plurality of orificed projections depending from the feeder floor, attenuating fibers from the streams of molten glass, and directing gas upwardly into contact with the streams of molten glass at a velocity and in an amount effective to convey away from the streams sufficient heat to render the glass of the streams attenuable to fibers without appreciably disturbing the ambient gas above the streams in the region of the orificed projections, with the improvement comprising restricting the flow of gas adjacent the plate in the region of the perimeter of the plurality of orificed projections while leaving the directed gas free to flow in the region of the perimeter of the streams of molten mineral material.

The present invention comprises apparatus for forming mineral fibers comprising a stream feeder having a plurality of orificed projections depending from the feeder floor for flowing streams of molten mineral material, means for attenuating fibers from the streams of molten mineral material, and means for directing gas upwardly into contact with the streams of molten mineral material at a velocity and in an amount effective to convey away from the streams sufficient heat to render the material of the streams attenuable to fibers without appreciably disturbing the ambient gas above the streams in the region between the orificed projections, with the improvement comprising a gas flow barrier extending peripherally of the plurality of orificed projections adapted to restrict the flow of gas adjacent the plate in the region of the orificed projections while leaving the directed gas free to flow adjacent the streams of material.

The present invention comprises a stream feeder for supplying streams of molten glass for attenuation into fibers comprising a bottom wall having rows of orificed projections for the supply of streams therethrough and a first member depending from the bottom wall and extending around the periphery of the orificed projections to restrict gas movement adjacent the bottom wall in the region of the orificed projections. The first member can depend from the bottom wall generally the same distance as the orificed projections. Also, the stream feeder can comprise a second member depending from the bottom wall and extending between portions of the first member for separating the orificed projections into groups to restrict the flow of gas between the groups adjacent the bottom wall.

An object of the invention is an improved method and apparatus for the production of mineral fibers.

Another object of the invention is to provide an improved stream feeder for use in the manufacture of mineral fibers, such as glass fibers.

These and other objects of the invention will become more apparent as the invention is described hereinafter in detail with reference to the accompanying drawings.

DESCRIPTION OF THE PREFERRED EMBODIMENTS

Before explaining the present invention in detail, it is to be understood that the invention is not limited in application to the details of construction and arrangement of the parts illustrated in the accompanying drawings, since the invention is capable of other embodiments and of being practiced or carried out in various ways to produce elements for other end uses. Also, it is to be understood that the phraseology employed herein is for the purpose of description and not of limitation.

While the method and apparatus of the invention has particular utility in the processing of glass for forming fibers or filaments, it is to be understood that the method and apparatus may be employed for producing fibers from other materials.

Figure 1:
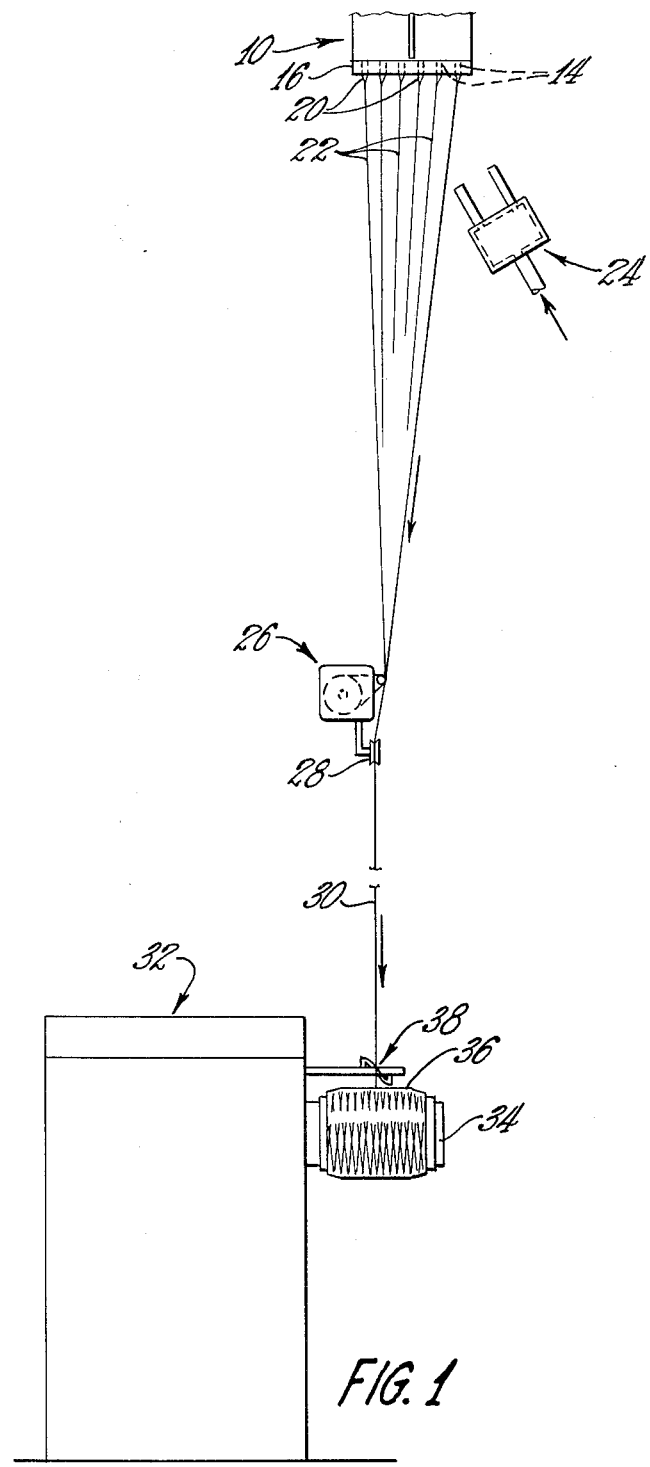
FIG. 1 is a semi-schematic elevational view of a fiber forming apparatus in accordance with the invention.

Referring to the drawings in detail, FIG. 1 illustrates a fiber forming operation. Mineral material, such as glass, is maintained in a molten condition in bushing or stream feeder assembly 10 from which a plurality of streams of material is emitted from orificed tips or projections depending from the feeder floor. The streams of glass 20 at the discharge end of the orificed projections are attenuated to fibers 22. The fibers are coated by size applicator 26 and gathered into a strand 30 by gathering shoe 28. The strand is then collected by winder assembly 32. The strand is reciprocated by traverse 38 for collection into a package 36 on winder collet 34.

To control the glass fiber forming environment, blower means 24 is provided. This blower means directs gas, such as air, upwardly into contact with the streams of molten mineral material at a velocity and in an amount effective to convey away from the streams sufficient heat to render the material of the streams attenuable to fibers without appreciably disturbing the ambient gas above the streams in the region between the orificed projections. Such a fiber forming operation with such a blower means is discussed in detail in commonly assigned U.S. Patent Application Ser. No. 952,039 which was filed Oct. 16, 1978 now U.S. Pat. No. 4,222,755 issued Sept. 16, 1980 and is hereby incorporated by reference.

Figure 2:
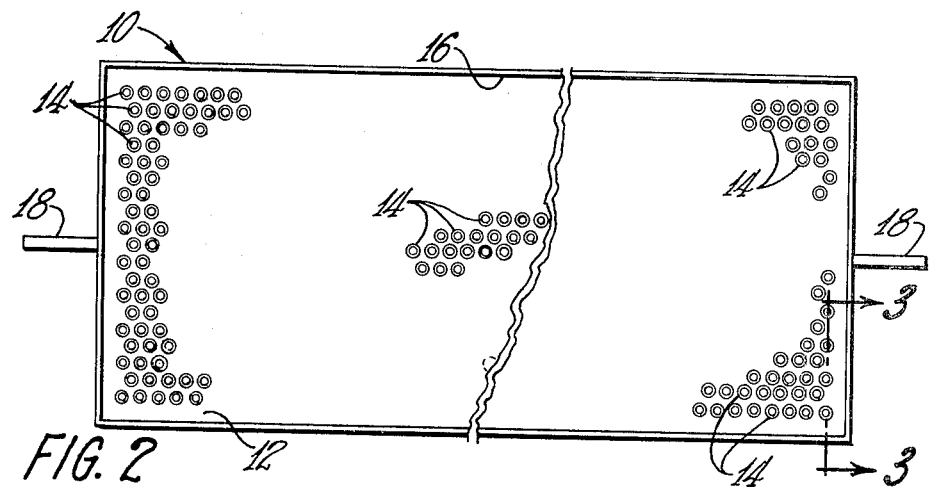
FIG. 2 is a bottom view of the bushing shown in FIG. 1.
Figure 3:
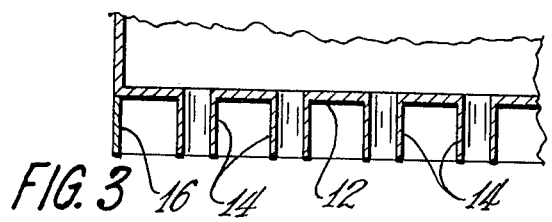
FIG. 3 is a partial sectional view of the bushing on line 3—3 of FIG. 2.

The bushing assembly of FIG. 1 is shown in greater detail in FIGS. 2 and 3. The bushing generally is of a box like configuration with a bottom wall and upwardly extending sidewalls. The bushing is constructed of a metallic alloy such as a platinum-rhodium alloy and is electrically heated through terminals 18. Bottom wall 12 has a plurality of orificed projections 14 depending from the feeder floor for flowing streams of molten material such as glass. As shown, the orificed projections are arranged in a series of rows. Gas flow barrier or fence member 16 is positioned around the perimeter of the plurality of orificed projections and is adapted to restrict the flow of gas adjacent the plate in the region of the orificed projections while leaving the directed gas free to flow adjacent the streams of material. As shown, the flow barrier projects from the bottom wall a distance generally equal to the projection of the orificed projections extend from the bottom wall and the flow barrier extends around the outer periphery of the bottom wall. It is, of course, within the scope of the invention that the flow barrier be of other configurations. For example, if the pattern orificed projections pattern were other than a rectangle as shown, such as a circle or diamond pattern, the flow barrier can follow the general shape of the outside row of orificed projections. The barrier can also be moved inwardly from the outer edge of the bottom wall or positioned adjacent the outer edge of the bottom wall adjacent the upwardly extending sidewall.

By use of the barrier around the outer periphery of the orificed projections the ambient air adjacent the feeder floor is more uniform in character and thus the temperature of the feeder floor and projections can be more uniformly controlled. For example, if the barrier is eliminated, flow of gas adjacent the feeder floor in the outer rows of orificed projections is different than that in the central region of the area of orificed projections. Use of the barrier aids in controlling the layer of air adjacent the feeder floor so that the floor is more uniform across the entire projection area.

The barrier or fence member can be constructed of a metallic material such as a platinum-rhodium alloy as is the bushing. The barrier can be connected to the bushings so that a portion of the electrical current flowing through the bushing passes through the barrier to electrically heat the barrier. Alternately, the barrier can be electrically isolated from the bushing so that it was not heated by the bushing current. Also, the barrier can be constructed of a insulating material which is not electrically conductive such as a ceramic or refractory material.

Figure 4:
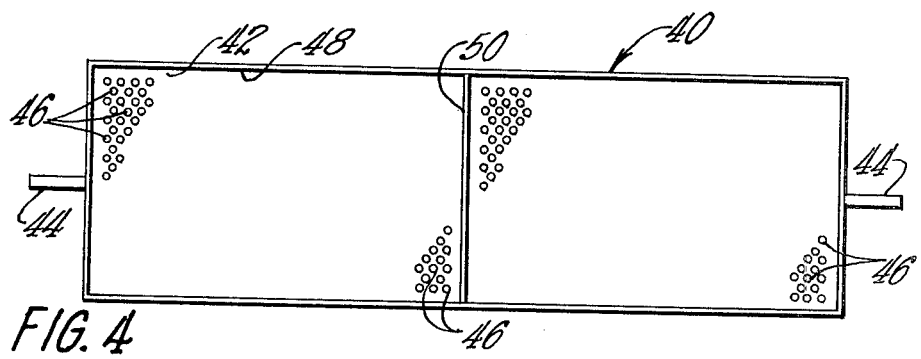
FIG. 4 is a bottom view of a bushing construction in one embodiment of the invention.

FIG. 4 illustrates another bushing construction in accordance with the invention. Bushing 40 comprises bottom wall 42 with orificed projections 46 extending therefrom. The bushing is electrically heated through terminals 44. Air flow barrier 48 is similar to the barrier disclosed in regard to FIG. 2. The bushing comprises a second gas flow barrier or divider member 50 for dividing the plurality of orificed projections into groups. This second flow barrier is adapted to restrict the flow of gas adjacent the plate or bottom wall between the groups of projections while leaving the gas directed from the blower assembly free to flow in the region of the streams of molten glass. This second member, as was discussed above in regard to the flow barrier 16, can be of an electrically conductive material and be electrically heated or can be of a thermally insulating non-conductive material such as a refractory material or a ceramic material.

Figure 5:
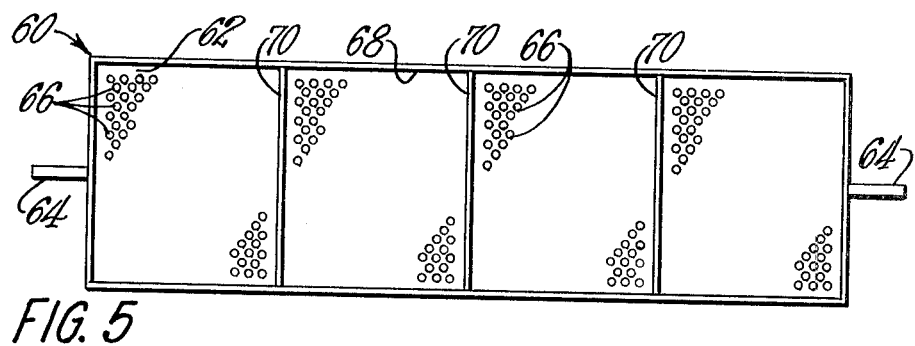
FIG. 5 is a bottom view of a bushing assembly in one embodiment of the invention.

FIG. 5 illustrates another embodiment of a stream feeder configuration in accordance with the invention. Feeder 60 comprises bottom wall 62 with orificed projections 66 extending therefrom. The bushing is electrically heated through terminals 64. Air flow barrier 68 extends around the periphery of the entire orifice projection area in a similar manner as the barrier which was discussed above in regard to FIG. 2. The bushing comprises three divider members or barriers 70 extending between portions of the fence or flow barrier 68 to divide the orificed projections into four groups. These divider members are similar to divider member 50 of FIG. 4 and are adapted to restrict the flow of gas adjacent the plate between the groups of orificed projections while leaving the directed gas from the blower assembly free to flow in the region of the streams of molten glass.

Having described the invention in detail, it will be understood that such specifications are given for the sake of explanation. Various modifications and substitutions other than those cited may be made without departing from the scope of the invention as defined in the following claims.

INDUSTRIAL APPLICABILITY

The present invention would be useful in the mineral fiber forming art and, in particular, in the glass fiber forming art.

I claim:

1. In an apparatus for forming mineral fibers comprising a stream feeder having a plurality of orificed projections depending from the feeder floor for flowing streams of molten mineral material, means for attenuating fibers from the streams of molten mineral material, and means for directing gas upwardly into contact with the streams of molten mineral material at a velocity and in an amount effective to convey away from the streams sufficient heat to render the material of the streams attenuable to fibers without appreciably disturbing the ambient gas above the streams in the region of the orificed projections, the improvement comprising a gas flow barrier extending peripherally of the plurality of orificed projections and depending from the feeder floor a distance generally equal to the depending projections adapted to restrict flow of gas adjacent the orificed projections in the region between feeder floor and the depending ends of the orificed projections while leaving the directed gas unrestricted to flow in the region of the streams of material exiting the orificed projections.

2. The apparatus of claim 1 wherein the gas flow barrier depends from the feeder floor a distance less than the depending orificed projections.

3. The apparatus of claim 1 wherein the gas flow barrier comprises an electrically non-conductive material to electrically isolate the gas flow barrier from the stream feeder.

4. The apparatus of claim 1 comprising a second gas flow barrier dividing the plurality of orificed projections into groups, the second gas flow barrier being adapted to restrict the flow of gas adjacent the plate in the region of the groups while leaving the directed gas free to flow in the region of the streams of molten glass.

5. A stream feeder for supply of streams of molten glass for attenuation into fibers comprising:
 (a) a bottom wall having rows of orificed projections for the supply of stream therethrough; and
 (b) a first member depending from the bottom wall generally the same distance as the orificed projections and extending around the periphery of the orificed projections to restrict gas movement adjacent the orificed projections in the region between the bottom wall and the projecting ends of the orificed projections.

6. The stream feeder of claim 5 wherein the depending member projects from the bottom wall a distance less than the orificed projections.

7. The stream feeder of claim 5 comprising a second member depending from the bottom wall and extending between portions of the first member for separating the orificed projections into groups to restrict the flow of gas adjacent the bottom wall between the groups.

* * * * *